United States Patent
Firestone

[15] 3,679,712
[45] July 25, 1972

[54] METHOD FOR THE PREPARATION OF (CIS-1,2-EPOXYPROPYL)PHOSPHONIC ACID DERIVATIVES

[72] Inventor: Raymond A. Firestone, Fanwood, N.J.
[73] Assignee: Merck & Co., Inc., Rahway, N.J.
[22] Filed: Jan. 29, 1969
[21] Appl. No.: 795,041

[52] U.S. Cl. ..........................260/348 R, 260/948, 260/959, 260/950, 260/952, 424/203
[51] Int. Cl..........................C07f 9/38, C07f 9/40, C07f 9/44
[58] Field of Search..................................260/348

Primary Examiner—Norma S. Milestone
Attorney—Joseph W. Molasky, J. Jerome Behan and I. Louis Wolk

[57] ABSTRACT

A method for the preparation of (±) and (−) (cis-1,2-epoxypropyl)phosphonic acid and its salt, amide and ester derivatives via the reaction of a 2-oxy substituted n-propylphosphonate or diamide analog with a reagent capable of effecting ring closure. The (±) and (−) (cis-1,2-epoxypropyl)phosphonic acid product thus obtained and its salts are antimicrobial agents which are useful in inhibiting the growth of gram-positive and gram-negative pathogenic bacteria.

5 Claims, No Drawings

3,679,712

METHOD FOR THE PREPARATION OF (CIS-1,2-EPOXYPROPYL)PHOSPHONIC ACID DERIVATIVES

This invention relates to a novel method for the preparation of (±) and (−) (cis-1,2-epoxypropyl)phosphonic acid and the salt, amide and ester derivatives thereof via the reaction of a 2-oxy substituted n-propylphosphonate or diamide analog with a reagent capable of effecting ring closure.

The (±) and (−) (cis-1,2-epoxypropyl)phosphonic acid of this invention and its salts are useful as antimicrobial agents, which inhibit the growth of both gram-positive and gram-negative pathogenic bacteria. The (−) form, and particularly the salts, such as the sodium and calcium salts, are active against *Bacillus*, *Escherichia*, *Staphylococci*, *Salmonella* and *Proteus* pathogens, and antibiotic-resistant strains thereof. Illustrative of such pathogens are Bacillus subtilis, *Escherichia coli*, *Salmonella schottmuelleri*, *Salmonella gallinarum*, *Salmonella pullorum*, *Proteus vulgaris*, *Proteus mirabilis*, *Proteus morganii*, *Staphylococcus aureus* and *Staphylococcus pyogenes*. Thus, (±) and (−) (cis-1,2-epoxypropyl)phosphonic acid and its salts can be used as antiseptic agents to remove susceptible organisms from pharmaceutical, dental and medical equipment and other areas subject to infection by such organisms. Similarly, they can be used to separate certain microorganisms from mixtures of microorganisms. Salts of (−) (cis-1,2-epoxypropyl)phosphonic acid are also useful in the treatment of diseases caused by bacterial infections in man and animals and are particularly valuable in this respect, since it is active against resistant strains of pathogens. These salts are especially valuable, since they are effective when given orally, although they can also be administered parenterally.

The novel process of this invention consists in treating a 2-oxy substituted n-propylphosphonate or diamide analog (II infra) with a reagent capable of effecting ring closure to afford a (cis-1,2-epoxypropyl)phosphonate product which, if desired, may be converted to (cis-1,2-epoxypropyl)phosphonic acid via the several methods discussed below. The temperature at which the reaction is conducted is not a critical aspect of the invention and, in general, the reaction may be conducted at temperatures in the range of from ambient temperatures up to the boiling point of the reaction medium. The reaction may be conducted in any diluent in which the starting materials are reasonably soluble and which is substantially inert to the reactants employed. Suitable solvents include, for example, benzene, chlorobenzene, dimethylformamide, dimethyl sulfoxide, N-methylpyrrolidone and hexamethylphosphoramide and the like. The following equation illustrates the process of this invention:

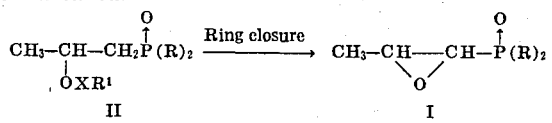

wherein R is hydroxy, straight or branched chain alkoxy, for example, lower alkoxy such as methoxy, ethoxy, n-propoxy, isopropoxy, n-butoxy, tert-butoxy, n-pentoxy and the like, lower alkenyloxy such as allyloxy and the like, lower alkynyloxy such as propynyloxy and the like, aryloxy, for example, mononuclear aryloxy such as phenoxy and the like, aralkyloxy, for example, mononuclear aralkyloxy such as benzyloxy and the like, dialkylamino, for example, di-lower alkylamino such as dimethylamino, diethylamino, di-n-propylamino, di-n-butylamino and the like, or when R is hydroxy, the alkali metal salts or alkaline earth metal salts of the resulting acid, such as the sodium, potassium, lithium, magnesium or calcium salt; $R^1$ is straight or branched chain alkyl, for example, lower alkyl such as methyl, ethyl, isopropyl, tert-butyl and the like, acyl, for example, lower alkanoyl such as acetyl, propionyl and the like, di-lower alkyl substituted mononuclear aryl such as 2,6-dimethylphenyl and the like or mononuclear aralkyl such as benzyl and X is oxygen or sulfur.

Any reagent capable of converting the 2-oxy substituted n-propyl-phosphonate starting material (II) or the diamide analog thereof to the desired (cis-1,2-epoxypropyl)phosphonate product (I) may be employed as the ring closing agent in the instant process. Suitable reagents include, for example, the alkali metal hydrides such as sodium hydride and the like, peroxides which decompose at the particular temperature employed as, for example, the diacyl peroxides such as di-lower alkanoyl peroxide illustrated by di-acetyl peroxide or a di-aroyl peroxide such as dibenzoyl peroxide and the like or di-lower alkyl peroxides such as di-tert-butyl peroxide and the like or 2,2'-azobisisobutyronitrile; however, certain of the 2-oxy-n-propylphosphonate starting materials or diamide analogs thereof (II) are most advantageously converted to the desired product (I) via the use of a preferred or select class of ring closing agents. For example, the phosphonic acid starting material corresponding to formula II, supra, wherein R is hydroxy are most advantageously converted to (cis-1,2-epoxypropyl) phosphonic acid by using a peroxide or 2,2'-azobisisobutyronitrile.

A preferred embodiment of this invention comprises treating the alkali metal, alkaline earth metal or di-lower alkyl ester derivatives of the 2-oxy substituted n-propylphosphonic acid starting material (IIa, infra) with a metal hydride to afford the corresponding (cis-1,2-epoxypropyl)phosphonate:

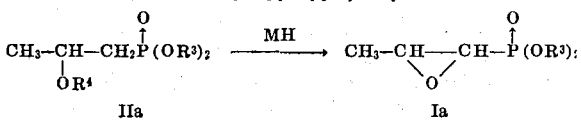

wherein MH is an alkali metal hydride such as sodium hydride and the like, $R^3$ is a branched chain alkyl, for example, branched chain lower alkyl such as isopropyl, tert-butyl and the like, the cation derived from an alkali metal or alkaline earth metal and $R^4$ is branched chain lower alkoxy such as isopropoxy, tert-butoxy and the like, branched chain lower alkylthio such as isopropylthio, tert-butylthio and the like, di-lower alkyl substituted mononuclear aryloxy such as 2,6-dimethylphenoxy and the like, a di-lower alkyl substituted mononuclear arylthio such as 2,6-dimethylphenylthio and the like, acyloxy, for example, lower alkanoyloxy such as acetoxy or mononuclear aralkyloxy such as benzyloxy and the like. This embodiment for preparing the (cis-1,2-epoxypropyl)phosphonates which correspond to formula Ia is advantageously employed to afford a high yield of the desired product when the $R^3$ and $R^4$ substituents of said derivatives of 2-oxy substituted n-propylphosphonic acid (IIa) are as defined above.

A second preferred embodiment of this invention comprises treating a 2-oxy substituted n-propylphosphonic acid or its ester derivatives (IIb, infra) with a peroxide or with 2,2'-azobisisobutyronitrile to afford the corresponding (cis-1,2-epoxypropyl)phosphonic acid or its ester derivatives:

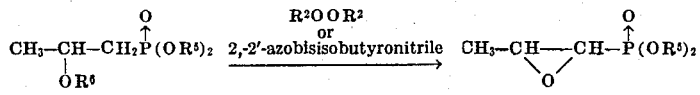

wherein $R^2$ is acyl, for example, alkanoyl such as acetyl and the like, aroyl, for example, nononuclear aroyl such as benzoyl and the like or lower alkyl such as tert-butyl and the like; $R^5$ is hydrogen, lower alkyl such as methyl, tert-butyl and the like or mononuclear aryl such as phenyl and the like; $R^6$ is lower alkoxy such as methoxy, tert-butoxy and the like or acyloxy, for example, lower alkanoyloxy such as acetoxy and the like. This embodiment is advantageously employed to prepare in a high yield the (cis-1,2-epoxypropyl)phosphonic acid and its ester derivatives, which correspond to formula Ib when the $R^5$ and $R^6$ substituents of 2-oxy substituted n-propylphosphonic acid and its ester derivatives (IIb) are as defined above.

When the reaction of a 2-oxy substituted n-propylphosphonate or the diamide analog thereof (II) with a reagent capable of effecting ring closure results in an isomeric mixture of the desired product, the isomers may be separated by various methods, as, for example, by gas or adsorption chromatography.

The ester and amide derivatives of (cis-1,2-epoxypropyl)phosphonic acid may be converted to (cis-1,2-epoxypropyl)phosphonic acid or its salts by various methods including treatment with an aqueous solution of a mineral acid such as hydrochloric acid or sulfuric acid under carefully buffered conditions, by hydrogenolysis, by treatment with an aqueous solution of an alkali metal or alkaline earth metal hydride or by treatment with trimethylchlorosilane followed by aqueous hydrolysis.

The choice of a suitable method for the conversion of the esters and amides to (cis-1,2-epoxypropyl)phosphonic acid or its salts depends to a large extent upon the character of the ester or amide moiety. For example, when the ester is monomethyl or dimethyl ester, the conversion to (cis-1,2-epoxypropyl)phosphonic acid is most advantageously conducted by treating the ester with trimethylchlorosilane followed by the aqueous hydrolysis of the silane ester intermediate thus obtained to the free acid. In addition to the foregoing, the alkyl esters of (cis-1,2-epoxypropyl)phosphonic acid and the aryl analogs thereof may be converted to the free acid by alkaline hydrolysis.

Amides of (cis-1,2-epoxypropyl)phosphonic acid may be converted to (cis-1,2-epoxypropyl)phosphonic acid via the use of acidic hydrolyzing agents such as aqueous hydrochloric acid, hydrobromic acid, sulfuric acid and the like. Hydrogenolysis is particularly effective in converting alkenyl esters of (cis-1,2-epoxypropyl)phosphonic acid to the desired (cis-1,2-epoxypropyl)phosphonic acid.

The alkali or alkaline earth metal salts of (cis-1,2-epoxypropyl)phosphonic acid may be converted to the (cis-1,2-epoxypropyl)phosphonic acid by various means, as for example, by passing an alkali metal or alkaline earth metal salt of the said acid through an ion exchange resin on its hydrogen cycle or by treatment with a stoichmetric amount of aqueous mineral acid.

The racemic mixture of (±) (cis-1,2-epoxypropyl) phosphonic acid can be resolved into its optically active components by the crystallization of a salt of (±) (cis-1,2-epoxypropyl)phosphonic acid prepared by reaction with an optically active base. Suitable bases which may be employed for this purpose include, for example, quinine, d-α-phenethylamine, strychnine, quinidine and the like. After one of the salts is isolated, it can be treated with a base such as sodium hydroxide, calcium carbonate, or ammonium hydroxide in order to obtain the optically active acid in the form of a salt, the particular salt depending upon the base used. If desired, the (−) (cis-1,2-epoxypropyl)phosphonic acid may be obtained by various means as, for example, by passing a solution of an alkali metal or alkaline earth metal derivative thereof through an ion exchange resin at 0°–5° C. on its hydrogen cycle.

The 2-oxy substituted n-propylphosphonates and diamide analogs (II, infra) which are employed as starting materials in the process of this invention are conveniently obtained by treating a (2-hydroxypropyl)phosphonic acid alkali metal salt or its ester, amide alkali metal or alkaline earth metal derivatives (III, infra) with a peroxide or a disulfide. The following equation illustrates this method of preparation:

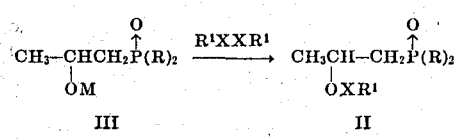

III　　　　　　　　　　II wherein R is as defined above, M is an alkali metal cation such as sodium, potassium and the like and $R^1XXR^1$ represents a peroxide or disulfide wherein $R^1$ and X are as defined above.

The ester, amide, alkali metal and alkaline earth metal derivatives of (2-hydroxypropyl)phosphonic acid alkali metal salts (III, supra) which are intermediates in the preparation of the 2-oxy substituted n-propylphosphonate and diamide analogs (II, supra) are conveniently prepared by reacting a 2-hydroxy-n-propylphosphonate or the diamide analog thereof (IV, infra) with an alkali metal hydride such as sodium hydride and the like in a suitably inert solvent such as dimethylformamide, dimethylsulfoxide, N-methylpyrrolidone, hexamethylphosphoramide and the like. The following equation illustrates this method of preparation:

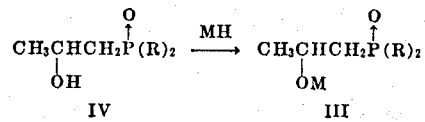

IV　　　　　　　　　　III wherein M, MH and R are as defined above.

The di-alkali metal salts of 2-hydroxy-n-propyl phosphonic acid (IVa, infra) are conveniently prepared by reacting a di-ester or di-amide derivative of (2-hydroxy-n-propyl)phosphonic acid (V, infra) with an alkali metal hydroxide such as sodium hydroxide, potassium hydroxide and the like to yield the desired di-alkali metal salt of 2-hydroxy-n-propyl phosphonic acid (IVa, infra). Any solvent in which the alkali metal hydroxides are soluble may be employed in this reaction. Suitable solvents include, for example, water, alkanols, for example, lower alkanols such as methanol, ethanol and the like. This reaction is conveniently conducted at the boiling point of the particular solvent employed. The following equation illustrates this process:

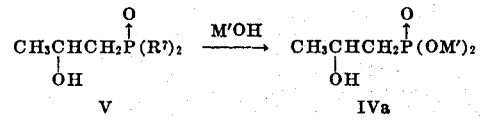

V　　　　　　　　　　IVa wherein $R^7$ is alkoxy such as methoxy, ethoxy, n-propoxy, isopropoxy, n-butoxy, tert-butoxy, n-pentoxy and the like, lower alkenyloxy such as allyloxy and the like, lower alkynyloxy including propynyloxy and the like, aryloxy, for example, mononuclear aryloxy such as phenoxy and the like, aralkoxy, for example, mononuclear aralkoxy including benzyloxy and the like, di-alkylamino, for example, di-lower alkylamino such as dimethylamino, diethylamino, di-n-propylamino, di-n-butylamino and the like and M'OH is an alkali metal hydroxide wherein M' is an alkali metal cation such as sodium, potassium and the like.

The di-ester or di-amide derivatives of 2-hydroxy-n-propyl phosphonic acid (V) which are used as intermediates in the preparation of the di-alkali metal salt derivatives of 2-hydroxy-n-propyl phosphonic acid (IVa, supra) and in the preparation of the di-ester and di-amide derivatives of a 2-alkali metal substituted hydroxypropyl phosphonic acid (III, supra) is conveniently prepared by treating the (2-hydroxy-n-propyl)phosphonic acid di-ester or di-amide peracetate (VI, infra) with a reducing agent as, for example, with a complex metal hydride such a lithium aluminum hydride and the like. While any ether solvent in which the complex metal hydride is reasonably soluble may be employed, it has been found that diethyl ether is particularly suitable and is preferred. Also, the reaction is preferably conducted at temperatures in the range of from about −25° C. to about 35° C. The following equation illustrates this process:

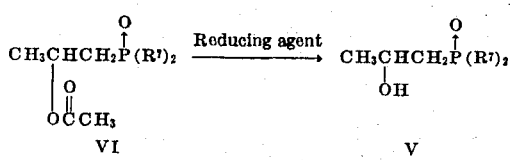

VI　　　　　　　　　　V wherein $R^7$ is as defined above.

The (2-hydroxy-n-propyl) phosphonic acid di-ester and di-amide peracetates (VI, infra) are either known compounds or may be prepared by treating isopropenyl acetate (VII, infra) with a phosphonate or phosphonic acid di-amide having the formula: $HPO(R)_2$ wherein R is as defined above, with a catalytic amount of a peroxide such as benzoyl peroxide and the like. The reaction is conducted using as the solvent an excess of the phosphonate or phosphonic acid di-amide reactant, preferably, in a ratio of 2.5 mole of phosphonate or phosphonic acid diamide to 1.0 mole of isopropenyl acetate. The reaction is conducted at a temperature in the range of from about 85°–95° C. The following equation illustrates this process:

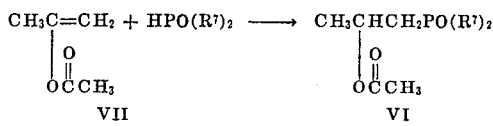

VII           VI wherein $R^7$ is as defined above.

The (−) (cis-1,2-epoxypropyl)phosphonic acid referred to herein rotates plane-polarized light in a counterclockwise direction (to the left as viewed by the observer) when the rotation of its disodium salt is measured in water (5 percent concentration) at 405 μ.

The designation cis used in describing the 1,2-epoxypropylphosphonic acid compounds means that each of the hydrogen atoms attached to carbon atoms 1 and 2 of the propylphosphonic acid are on the same side of the oxide ring.

The following examples illustrate the method of preparing (cis-1,2-epoxypropyl)phosphonic acid and its salt, amide and ester derivatives thereof according to the process of this invention. However, the examples are illustrative only and it will be apparent to one having ordinary skill that all the products of the invention may be prepared by substituting the appropriate starting materials for those used in the examples.

With regard to the terms phosphites and phosphonates, it should be pointed out that phosphonic acid and phosphorus acid are tautomers of one another and that derivatives of each can be called either phosphonates or phosphites, respectively. Tri-substituted derivatives, such as tri-salts or tri-esters are preferably called phosphites. The mono- or di-substituted derivatives or di-substituted derivatives which have an organic radical directly attached to the phosphorus atom are preferably called phosphonate.

EXAMPLE 1

(−) (Cis-1,2-epoxypropyl)phosphonic Acid Disodium Salt

Step A: Dimethyl (2-acetoxypropyl)phosphonate

A solution of benzoyl peroxide (0.5 g.) in isopropenylacetate (9.3 g., 0.093 mole) is added slowly, with stirring, to dimethylphosphonate (25.0 g., 0.23 mole) at 85°–95 C. over a three-hour period. To the reaction mixture is added another quantity of benzoyl peroxide (0.5 g.) and the reaction mixture heated for one more hour. The excess dimethylphosphonate is removed under reduced pressure and the residual oil is fractionally distilled to yield dimethyl (2-acetoxypropyl)phosphonate.

Step B: Dimethyl (2-hydroxypropyl)phosphonate

A suspension of dimethyl (2-acetoxypropyl)phosphonate (1.0 g., 0.0048 mole) in diethyl ether (100 ml.) is treated with lithium aluminum hydride (0.181 g., 0.00238 mole) for 1 ½ hours at ambient temperature. Ice water (100 ml.) is added to the slurry and the ether layer which separates is collected and dried over magnesium sulfate. The ether solution is filtered and the ether removed under vacuum to yield dimethyl (2-hydroxypropyl)phosphonate.

Step C: Dimethyl (2-hydroxypropyl)phosphonate Sodium Salt

To a solution of dimethyl (2-hydroxypropyl)phosphonate (0.8 g., 0.00476 mole) in dimethylformamide (50 ml.) is added sodium hydride (0.114 g., 0.00476 mole) to form dimethyl (2-hydroxypropyl)phosphonate sodium salt.

Step D: (2-Hydroxypropyl)phosphonic Acid Dimethyl Ester Peracetate

To a solution of dimethyl (2-hydroxypropyl)phosphonate sodium salt (0.85 g., 0.0045 mole) in dimethylformamide is added diacetyl peroxide (0.53 g., 0.0045 mole). The solution is then diluted with diethyl ether to precipitate sodium acetate which is removed by filtration; the solvents are removed from the solution under reduced pressure to yield (2-hydroxypropyl)phosphonic acid dimethyl ester peracetate.

Step E: Dimethyl (Cis-1,2-epoxypropyl)phosphonate

To (2-hydroxypropyl)phosphonic acid dimethyl ester peracetate (1.03 g., 0.0045 mole) is added n-butyraldehyde (1.44 g., 0.02 mole) and diacetyl peroxide (0.53 g., 0.0045 mole). The reaction mixture is refluxed for 18 hours. The reaction mixture is cooled and extracted with diethyl ether. The ether solution is washed successively with aqueous sodium bicarbonate and water and then dried over sodium sulfate. The ether solution is filtered, the ether removed under vacuum, and the residue chromatographed to yield dimethyl (cis-1,2-epoxypropyl)phosphonate.

Step F: (Cis-1,2-epoxypropyl)phosphonic Acid and Disodium Salt

Dimethyl (cis-1,2-epoxypropyl)phosphonate (1 mm.) in trimethylchlorosilane (10 ml.) is refluxed for 8 hours and the reaction mixture is then extracted with water to yield an aqueous solution of (±) (cis-1,2-epoxypropyl)phosphonic acid. The product thus obtained is then treated with two equivalents of sodium hydroxide and the solution evaporated to yield the disodium salt of (±) (cis-1,2-epoxypropyl)phosphonic acid.

Step G: (−) (Cis-1,2-epoxypropyl)phosphonic Acid Disodium Salt

The disodium salt of (±) (cis-1,2-epoxypropyl)phosphonic acid is treated with d-α-phenethylamine (2.24 g., 0.0185 mole) in methanol (200 ml.). The solution is concentrated to dryness and the residue dissolved in methanol (50 ml.) and seeded with a few crystals of the d-α-phenethylamine salt of (±) (cis-1,2-epoxypropyl)phosphonic acid. The mixture is allowed to stand at room temperature, whereupon the crystalline salt precipitates. The precipitate is collected and triturated with methanol, filtered and washed with ethanol and acetone to yield the d-α-phenethylamine salt of (−) (cis-1,2-epoxypropyl)phosphonic acid having a melting point of 135°–137° C. The product has a specific rotation of −2.6° at 4,050 A and 28° C. 165 mg. of the d-α-phenethylamine salt is then reconverted to the disodium salt of (−) (cis-1,2-epoxypropyl)-phosphonic acid by suspending the d-α-phenethylamine salt in water and adding sodium hydroxide. The resulting suspension is washed with chloroform. The aqueous phase is collected and freeze dried to obtain the disodium salt of (−) (cis-1,2-epoxypropyl)phosphonic acid. The disodium salt is dissolved in 2 ml. of water, and the specific rotation is measured in a 0.5 decimeter tube. The product, calculated on the basis of the free acid, has a specific rotation of −14.0° at 4,050 A and 28° C.

Elemental analysis for $C_3H_5Na_2PO_4$:

Calc.: C, 19.79; H, 277;

Found: C, 20.03; H, 2.74.

EXAMPLE 2

(Cis-1,2-epoxypropyl)phosphonic Acid Calcium Salt

Step A: Diethyl (2-Acetoxypropyl)phosphonate

A solution of benzoyl peroxide (0.5 g.) in isopropenylacetate (9.3 g., 0.093 mole) is added slowly, with stirring, to diethylphosphonate (31.9 g., 0.23 mole) at 85°–95° C. over a 3-hour period. To the reaction mixture is added another quantity of benzoyl peroxide (0.5 g.) and the reaction mixture heated for 1 more hour. The excess diethylphosphonate is removed under reduced pressure and the residual oil is fractionally distilled to yield diethyl (2-acetoxypropyl)phosphonate, b.p. 89°–93° C.

Step B: Diethyl (2-Hydroxypropyl)phosphonate

By substituting an equimolar quantity of diethyl (2-acetoxypropyl)phosphonate for the dimethyl (2-acetoxypropyl)phosphonate in Example 1, Step B, and by following substantially the procedure described therein, there is obtained diethyl (2-hydroxypropyl)phosphonate.

Step C: Diethyl (2-Hydroxypropyl)phosphonate Sodium Salt

By substituting an equimolar quantity of diethyl (2-hydroxypropyl)phosphonate for the dimethyl (2-hydroxypropyl)phosphonate of Example 1, Step C, and by following substantially the procedure described therein, there is obtained diethyl (2-hydroxypropyl)phosphonate sodium salt.

Step D: (2-Hydroxypropyl)phosphonic Acid Diethyl Ester Peracetate

By following the procedure described in Example 1, Step D, and by substituting for the dimethyl (2-hydroxypropyl)phosphonate sodium salt an equimolar quantity of diethyl (2-hydroxypropyl)phosphonate sodium salt there is obtained (2-hydroxypropyl)phosphonic acid diethyl ester peracetate.

Step E: Diethyl (Cis-1,2-epoxypropyl)phosphonate

To a mixture of n-butyraldehyde (7.21 g., 0.1 mole) and (2-hydroxypropyl)phosphonic acid diethyl ester peracetate (5.8 g., 0.025 mole) is added benzoylperoxide (0.2 g., 0.00085 mole). The reaction mixture is refluxed for 18 hours. The reaction mixture is then cooled and extracted with diethyl ether. The ether extract is then washed successively with aqueous sodium bicarbonate and water and then dried over sodium sulfate. The ether is removed and the residue chromatographed to yield diethyl (cis-1,2-epoxypropyl)phosphonate.

Step F: (Cis-1,2-epoxypropyl)phosphonic Acid Calcium Salt

To a solution of diethyl (cis-1,2-epoxypropyl)phosphonate (3.6 g., 0.02 mole) in 30 percent ethanol-water (10 ml.) is added calcium hydroxide (1.12 g., 0.02 mole). The solution is refluxed for 1.5 hours under nitrogen to yield the calcium salt of (cis-1,2-epoxypropyl)phosphonic acid.

EXAMPLE 3

(Cis-1,2-epoxypropyl)phosphonic Acid and Dipotassium Salt

Step A: Dibenzyl (2-Acetoxypropyl)phosphonate

By substituting for the dimethylphosphonate of Example 1, Step A, an equimolar quantity of dibenzylphosphonate and by following the procedure described therein there is obtained dibenzyl (2-acetoxypropyl)phosphonate.

Step B: Dibenzyl (2-Hydroxypropyl)phosphonate

By following substantially the procedure as described in Example 1, Step B, and by substituting for the dimethyl (2-acetoxypropyl)phosphonate an equimolar quantity of dibenzyl (2-acetoxypropyl)phosphonate there is obtained dibenzyl (2-hydroxypropyl)phosphonate.

Step C: Disodium (2-Hydroxypropyl)phosphonate

A mixture of dibenzyl (2-hydroxypropyl)phosphonate (1.44 g., 0.0045 mole) and aqueous sodium hydroxide (3.6 ml. of 2.5 N, 6.009 mole) is refluxed for 2 hours. Evaporation of the solvent yields disodium (2-hydroxypropyl)phosphonate.

Step D: (2-Hydroxypropyl)phosphonic Acid Trisodium Salt

Disodium (2-Hydroxypropyl)phosphonate (0.75 g., 0.0045 mole) is dissolved in dimethylformamide (100 ml.) and treated with sodium hydride (0.108 g., 0.0045 mole) to yield (2-hydroxypropyl)phosphonic acid trisodium salt.

Step E: (2-Hydroxypropyl)phosphonic Acid Peracetate

To the solution of (2-hydroxypropyl)phosphonic acid trisodium salt in dimethylformamide prepared above in Step D of this example is added diacetylperoxide (0.53 g., 0.0045 mole). The mixture is neutralized with glacial acetic acid and the dimethylformamide removed under vacuum. Diethyl ether is added to the residue and the insoluble material removed by filtration. Evaporation of the solvent yields the (2-hydroxypropyl)phosphonic acid peracetate.

Step F: Disodium Salt of (2-Hydroxypropyl)phosphonic Acid Peracetate

To a solution of (2-hydroxypropyl)phosphonic acid peracetate in ether (100 ml.) is added sodium hydride (0.216 g., 0.009 mole). The disodium salt of (2-hydroxypropyl)phosphonic acid peracetate precipitates and is collected by filtration.

Step G: Disodium Salt of (Cis-1,2-epoxypropyl)phosphonic Acid

By following substantially the procedure described in Step E, Example 1, and by substituting an equimolar quantity of the disodium salt of (2-hydroxypropyl)phosphonic acid peracetate for the (2-hydroxypropyl)phosphonic acid dimethyl ester peracetate described therein there is obtained the disodium salt of (cis-1,2-epoxypropyl)phosphonic acid.

EXAMPLE 4

P-(Cis-1,2-epoxypropyl)-N,N,N',N'-tetramethylphosphonic Diamide

Step A: (2-Acetoxypropyl)phosphonic-N,N,N',N'-tetramethyl Amide

By substituting for the dimethylphosphonate of Step A, Example 1, an equimolar quantity of phosphonic-N,N,N',N'-tetramethyl amide and by following substantially the procedure described therein there is obtained (2-acetoxypropyl)-phosphonic-N,N,N',N'-tetramethyl amide.

Step B: (2-Hydroxypropyl)phosphonic-N,N,N',N'-tetramethyl Amide

By substituting for the dimethyl (2-acetoxypropyl)phosphonate of Step B, Example 1, an equimolar quantity of (2-acetoxypropyl)phosphonic-N,N,N',N'-tetramethyl amide and by following substantially the procedure described therein there is obtained (2-hydroxypropyl)phosphonic-N,N,N',N'-tetramethyl amide.

Step C: (2-Hydroxypropyl)phosphonic-N,N,N',N'-
tetramethyl

Amide Sodium Salt

To a solution of (2-hydroxypropyl)phosphonic-N,N,N',N'-tetramethyl amide in dimethylformamide is added one equivalent of sodium hydride to form (2-hydroxypropyl)phosphonic-N,N,N',N'-tetramethyl amide sodium salt.

Step D: (2-Hydroxypropyl)phosphonic-N,N,N',N'-
tetramethyl

Amide Peracetate

To a solution of (2-hydroxypropyl)phosphonic-N,N,N',N'-tetramethyl amide sodium salt in dimethylformamide is added methylacetylperoxide. The solution is then diluted with diethyl ether to precipitate the sodium methoxide which is removed by filtration; the diethyl ether is removed under reduced pressure to yield (2-hydroxypropyl)phosphonic-N,N,N',N'-tetramethyl amide peracetate.

Step E: P-(Cis-1,2-epoxypropyl)-N,N,N',N'-tetramethyl phosphonic Diamide

A suspension of sodium hydride in dimethylformamide (50 ml.) is added to (2-hydroxypropyl)phosphonic-N,N,N',N'-tetramethyl amide peracetate over a period of 2 hours. At the end of the addition at room temperature, the reaction mixture is heated to 100° C. for 15 minutes to insure that the reaction is complete. The reaction mixture is cooled and diluted with diethyl ether and the salts which precipitate are removed by filtration. The filtrate is diluted with water and the pH is adjusted to neutrality with acetic acid. The ether layer is collected, washed with water (3 × 100 ml.) to remove the dimethylformamide and dried over magnesium sulfate. The ether solution is filtered and the ether removed under vacuum to yield P-(cis-1,2-epoxypropyl)-N,N,N',N'-tetramethylphosphonic diamide.

By substituting for the phosphonic-N,N,N',N'-tetramethylamide of Step A an equimolar quantity of phosphonic-N,N,N',N'-tetraethylamide, phosphonic-N,N,N',N'-tetra-n-propylamide or phosphonic-N,N,N',N'-tetra-n-butylamide and by following the procedures of Steps A-E of Example 4 there is obtained, respectively; P-(cis-1,2-epoxypropyl)-N,N,N',N'-tetraethyl phosphonic diamide, P-(cis-1,2-epoxypropyl)-N,N,N',N'-tetra-n-propyl phosphonic diamide and P-(cis-1,2-epoxypropyl)-N,N,N',N'-tetra-n-butyl phosphonic diamide.

EXAMPLE 5

Dimethyl (Cis-1,2-epoxypropyl)phosphonate

A suspension of sodium hydride (0.114 g., 0.00475 mole) in dimethylformamide (50 ml.) is added to (2-hydroxypropyl)phosphonic acid dimethyl ester peracetate over a 2-hour period. The reaction mixture is then heated to 100° C. for 15 minutes. The reaction mixture is cooled and diluted with diethyl ether. The reaction mixture is filtered and the filtrate is diluted with water and the pH is adjusted to neutrality with acetic acid. The ether layer is collected and washed with water and dried over magnesium sulfate. The ether solution is filtered to yield dimethyl (cis-1,2-epoxypropyl)phosphonate.

EXAMPLE 6

Diphenyl (Cis-1,2-epoxypropyl)phosphonate

Step A: Diphenyl 2-Acetoxypropylphosphonate

A solution of benzoyl peroxide (0.5 g.) in isopropenylacetate (9.3 g., 0.093 mole) is added slowly, with stirring, to diphenyl phosphonate (53.13 g., 0.23 mole) at 85°-95 C. over a 3-hour period. To the reaction mixture is added another quantity of benzoyl peroxide (0.5 g.) and the reaction mixture heated for one more hour. The excess diphenyl phosphonate is removed under reduced pressure and the residual oil is fractionally distilled to yield diphenyl 2-acetoxyproplyphosphonate.

Step B: Diphenyl 2-Hydroxypropylphosphonate

By substituting an equimolar quantity of diphenyl 2-acetoxypropylphosphonate for the dimethyl 2-acetoxypropylphosphonate in Example 1, Step B, and by following substantially the procedure described therein, there is obtained diphenyl 2-hydroxypropylphosphonate.

Step C: Diphenyl (2-Hydroxypropyl)phosphonate Sodium

Salt

By substituting an equimolar quantity of diphenyl 2-hydroxypropylphosphonate for the dimethyl 2-hydroxypropylphosphonate of Example 1, Step C, and by following substantially the procedure described therein, there is obtained diphenyl (2-hydroxypropyl)phosphonate sodium salt.

Step D: (2-Hydroxypropyl)phosphonic Acid Diphenyl

Ester Peracetate

By following the procedure as described in Example 1, Step D, and by substituting for the dimethyl (2-hydroxypropyl)phosphonate sodium salt an equimolar quantity of diphenyl (2-hydroxypropyl)phosphonate sodium salt, there is obtained (2-hydroxypropyl)phosphonic acid diphenyl ester peracetate.

Step E: Diphenyl (Cis-1,2-epoxypropyl)phosphonate

To a mixture of n-butyraldehyde (7.21 g., 0.1 mole) and (2-hydroxypropyl)phosphonic acid diphenyl ester peracetate (5.8 g., 0.025 mole) is added 2,2'-azobisisobutyronitrile (0.27 g., 0.002 mole). The reaction mixture is refluxed for 18 hours. The reaction mixture is then cooled and extracted with diethyl ether. The ether extract is then washed successively with aqueous sodium bicarbonate and water and then dried over sodium sulfate. The ether is removed and the residue fractionally distilled to yield diphenyl (cis-1,2-epoxypropyl)phosphonate.

EXAMPLE 7

(Cis-1,2-epoxypropyl)phosphonic Acid

Step A: (2-Acetoxypropyl)phosphonic Acid

By substituting for the dimethylphosphonate of Example 1, Step A, an equimolar quantity of phosphonic acid and by following the procedure described therein, there is obtained (2-acetoxypropyl)phosphonic acid.

Step B: (2-Hydroxypropyl)phosphonic Acid

By following substantially the procedure as described in Example 1, Step B, and by substituting for the dimethyl (2-acetoxypropyl)phosphonate an equimolar quantity of (2-acetoxypropyl)phosphonate an equimolar quantity of (2-hydroxypropyl)-phosphonic acid.

Step C: (2-Hydroxypropyl)phosphonic Acid Sodium Salt (2-Hydroxypropyl)phosphonic acid (0.63 g., 0.0045 mole) is dissolved in dimethylformamide (100 ml.) and treated with sodium hydride (0.108 g., 0.0045 mole) to yield (2-hydroxypropyl)phosphonic acid sodium salt.

Step D: (2-Hydroxypropyl)phosphonic Acid Peracetate

To the solution of (2-hydroxypropyl)phosphonic acid sodium salt in dimethylformamide prepared above in Step C of this example is added diacetylperoxide (0.53 g., 0.0045 mole). The mixture is neutralized with glacial acetic acid and the dimethylformamide removed under vacuum. Diethyl ether is added to the residue and the insoluble material removed by filtration. Evaporation of the solvent yields the (2-hydroxypropyl)phosphonic acid peracetate.

Step E: (Cis-1,2-epoxypropyl)phosphonic Acid

To a mixture of n-butyraldehyde (7.21 g., 0.1 mole) and (2-hydroxypropyl)phosphonic acid peracetate (4.6 g., 0.025 mole) is added benzoylperoxide (0.2 g., 0.0085 mole). The reaction mixture is refluxed for 18 hours to yield (cis-1,2-epoxypropyl)phosphonic acid.

In a manner similar to that described in Example 1 all of the products (I) of this invention may be obtained. Thus, by substituting the appropriate di-substituted phosphonate for the dimethyl phosphonate of Example 1, Step A, and following substantially the procedure described in Steps A–F of that Example, all of the products (I) of this invention may be prepared. The following equation illustrates the process of Example 1, Steps A–F, and the manner in which the products of Table I may be prepared:

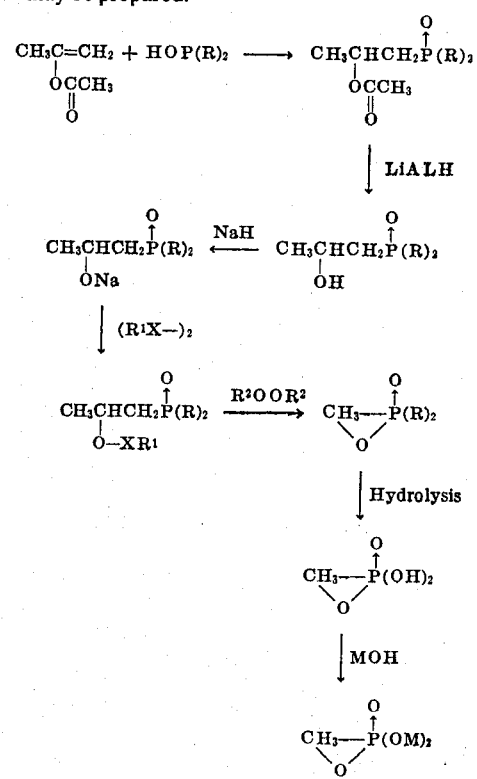

The above examples are illustrative of the novel method disclosed and it is to be understood that the invention is not to be limited by the specific illustrative examples but rather embraces all the variations and modifications thereof which fall within the scope of the foregoing discussion and the appended claims.

What is claimed is:

1. A process for preparing a compound having the formula:

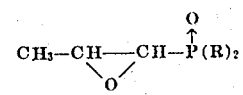

wherein R is hydroxy, straight or branched chain alkoxy, lower alkenyloxy, lower alkynyloxy, aryloxy, aralkoxy, dialkylamino and when R is hydroxy the alkali metal and alkaline earth metal salts of the resulting acid, which comprises treating a compound having the formula:

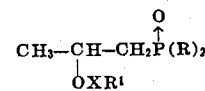

wherein R is as defined above; $R^1$ is straight or branched chain alkyl, lower alkanoyl, mononuclear aralkyl or lower alkyl substituted mononuclear aryl; and X is oxygen or sulfur, with an alkali metal hydride, a dialkyl peroxide, a di-lower alkanoyl peroxide, a di-aroyl peroxide or 2,2'-azobisisobutyronitrile.

2. The process according to claim 1 for preparing a compound having the formula:

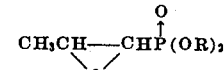

wherein R is branched chain alkyl or the cation derived from an alkali metal or an alkaline earth metal, which comprises treating a compound of the formula:

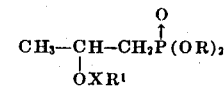

TABLE I

| Example | R | M | MOH | $R^1$—X— | $R^2$OO$R^2$ |
|---|---|---|---|---|---|
| 8 | —OCH$_2$CH$_2$CH$_3$ | Na | NaOH | CH$_3$S— | CH$_3$C(O)OC(O)CH$_3$ |
| 9 | —OCH(CH$_3$)$_2$ | Na | NaOH | (CH$_3$)$_3$C—O— | (CH$_3$)$_3$COOC(CH$_3$)$_3$ |
| 10 | —OCH$_2$(CH$_2$)$_2$CH$_3$ | K | KOH | C$_2$H$_5$—O— | C$_6$H$_5$—CH$_2$OOCH$_2$—C$_6$H$_5$ |
| 11 | —OCH$_2$(CH$_2$)$_3$CH$_3$ | K | KOH | CH$_3$C(O)—O— | CH$_3$C(O)OC(O)CH$_3$ |
| 12 | —OCH$_2$CH=CH$_2$ | Na | NaOH | (CH$_3$)$_3$C—O— | (CH$_3$)$_3$COOC(CH$_3$)$_3$ |
| 13 | —OCH$_2$—C≡CH | Na | NaOH | (CH$_3$)$_3$C—S— | (CH$_3$)$_3$COOC(CH$_3$)$_3$ |
| 14 | —OC(CH$_3$)$_3$ | K | KOH | 2,6-(CH$_3$)$_2$C$_6$H$_3$—O— | C$_6$H$_5$—CH$_2$OOCH$_2$—C$_6$H$_5$ |
| 15 | —OC(CH$_3$)$_3$ | Na | NaOH | C$_6$H$_5$—S— | (CH$_3$)$_3$COOC(CH$_3$)$_3$ | wherein R is as defined above; R¹ is branched chain alkyl, lower alkyl substituted mononuclear aryl, acetyl or benzyl and X is oxygen or sulfur, with an alkali metal hydride.

3. The process according to claim 1 for preparing a compound having the formula:

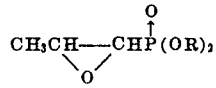

wherein R is isopropyl, tert-butyl or the cation derived from an alkali metal or an alkaline earth metal, which comprises treating a compound of the formula:

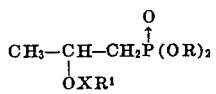

wherein R is as defined above, R¹ is tert-butyl, isopropyl, 2,6-dimethylphenyl, acetyl or benzyl and X is oxygen or sulfur, with an alkali metal hydride.

4. A process according to claim 1 for preparing a compound of the formula:

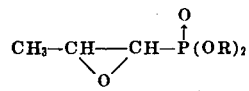

wherein R is methoxy, tert-butoxy or phenoxy, which comprises treating a compound of the formula:

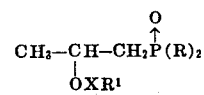

wherein R is as defined above, R¹ is tert-butyl, acetyl or methyl and X is oxygen or sulfur, with a reagent selected from a dialkyl peroxide, di-lower alkanoyl peroxide or a di-aroyl peroxide.

5. The process according to claim 1 for the preparation of (cis-1,2-epoxypropyl)phosphonic acid, which comprises treating (2-hydroxypropyl)phosphonic acid peracetate with benzoylperoxide.

* * * * *